United States Patent

Peso Parada et al.

(10) Patent No.: US 10,681,458 B2
(45) Date of Patent: Jun. 9, 2020

(54) TECHNIQUES FOR HOWLING DETECTION

(71) Applicant: Cirrus Logic International Semiconductor Ltd., Edinburgh (GB)

(72) Inventors: Pablo Peso Parada, Maidenhead (GB); Rahim Saeidi, Surrey (GB); John L. Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 16/004,900

(22) Filed: Jun. 11, 2018

(65) Prior Publication Data

US 2019/0379972 A1 Dec. 12, 2019

(51) Int. Cl.
*H04R 3/02* (2006.01)
*H04M 1/20* (2006.01)
*G10K 11/178* (2006.01)

(52) U.S. Cl.
CPC ............... *H04R 3/02* (2013.01); *H04M 1/20* (2013.01)

(58) Field of Classification Search
CPC ............ H04R 3/02; H04M 1/20; H04B 15/00
USPC ......................................... 381/93, 94.1, 94.7
See application file for complete search history.

(56) References Cited

U.S. PATENT DOCUMENTS

| | | | |
|---|---|---|---|
| 4,811,404 A | 3/1989 | Vilmur et al. | |
| 5,937,377 A | 8/1999 | Hardiman et al. | |
| 8,027,486 B1* | 9/2011 | Pandey | H04R 3/02 |
| | | | 381/93 |
| 8,494,178 B1* | 7/2013 | Carpenter | H04R 3/02 |
| | | | 361/1 |
| 8,996,365 B2* | 3/2015 | Yamaguchi | H04R 3/02 |
| | | | 704/225 |
| 2003/0012388 A1* | 1/2003 | Ura | H04R 3/02 |
| | | | 381/66 |
| 2011/0182439 A1* | 7/2011 | Sakurada | H04R 3/02 |
| | | | 381/94.1 |
| 2014/0126745 A1 | 5/2014 | Dickins et al. | |
| 2015/0071454 A1 | 3/2015 | Sunohara et al. | |
| 2015/0125015 A1 | 5/2015 | Van Der Werf | |

FOREIGN PATENT DOCUMENTS

| | | |
|---|---|---|
| EP | 2203000 A1 | 6/2010 |
| EP | 3148214 A1 | 3/2017 |
| WO | 9718647 A1 | 5/1997 |
| WO | 2016100602 A1 | 6/2016 |
| WO | 2017079053 A1 | 5/2017 |
| WO | 20180036602 A1 | 3/2018 |

OTHER PUBLICATIONS

Combined Search and Examination Report under Sections 17 and 18(3), UKIPO, Application No. 1811398.5, dated Dec. 17, 2018.
International Search Report and Written Opinion of the International Searching Authority, International Application No. PCT/GB2019/051467, dated Sep. 23, 2019.

* cited by examiner

*Primary Examiner* — Thjuan K Addy
(74) *Attorney, Agent, or Firm* — Jackson Walker L.L.P.

(57) ABSTRACT

A processing module for a noise control circuit may include a howling detector configured to receive an input signal and to determine a linearity metric based on the input signal, the linearity metric comprising a measure of the linearity of a logarithmic representation of the energy of the input signal. The processing module may also include a gain adjuster configured to adjust the gain of a noise control unit.

22 Claims, 11 Drawing Sheets

TECHNIQUES FOR HOWLING DETECTION

TECHNICAL FIELD

Embodiments described herein relate to techniques for active noise cancellation. In particular, embodiments described herein relate to techniques for suppressing an acoustic feedback signal.

BACKGROUND

Many devices include loudspeakers, which are used to play sounds to a user of the device, based on an input signal. For example, the input signal may be derived from a signal that has been received by the device over a communications link, in the case of a phone call or the like, or may be derived from stored data, in the case of music or speech playback.

As wireless communication devices, Mp3 players and other devices for audio playback move even further into everyday use, features like noise cancellation become more important to help ensure higher-quality audio playback and phone calls.

Noise cancellation embraces a number of different approaches to eliminating unwanted noise in order to enhance the listening experience of a user. Active noise cancellation (ANC) or noise control refers to a method of reducing noise by the addition of anti-noise—i.e. a phase inverted noise signal—which destructively interferes with the noise. This is generally achieved by using a reference microphone to sense environmental or ambient noise and by deriving an anti-noise signal that is emitted by a speaker in order to cancel or at least control the noise. As will be appreciated by those skilled in the art active noise control can be achieved with analogue filters or digital filters, and is generally differentiated by architecture: feed-forward cancellation, feedback cancellation or hybrid cancellation.

Figure 1:
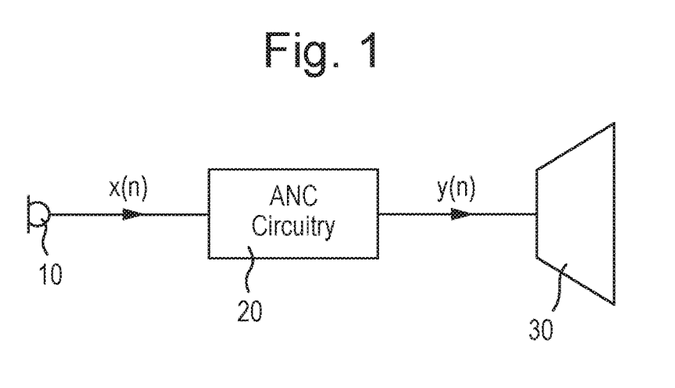
FIG. 1 provides a simplified illustration of a feedforward ANC system.

FIG. 1 provides a simplified illustration of a feedforward ANC system. As illustrated in FIG. 1, a reference microphone 10 detects incident ambient sounds—or noise—and generates an input signal x(n) for an ANC circuit 20. The ANC circuit 20 processes the signal in order to derive a control signal y(n) which is passed to the loudspeaker transducer 30 and is emitted by the loudspeaker 30 as anti-noise. Thus, the ANC circuit may be considered to comprise a filter having a transfer function $H_{nc}$ which inversely models the noise signal for generating the required control sound signal. An error microphone (not shown) is typically provided to measure the error between the noise signal and the anti-noise signal in order that the transfer function $H_{nc}$ or the respective gain of the ANC circuit may be adapted.

Figure 2:
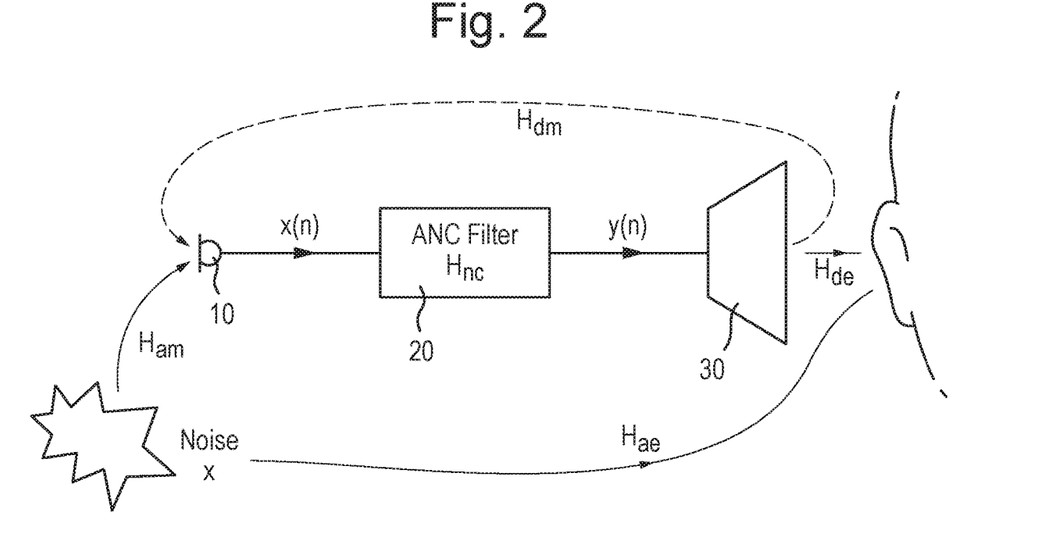
FIG. 2 provides a further illustration of a feedforward ANC system.

As illustrated in FIG. 2, it will be appreciated that the anti-noise signal will not only propagate on a path towards a user's ear $H_{de}$ (where d denotes the driver and e denotes the ear), but may also propagate on a leakage path, or feedback path $H_{dm}$ (where d denotes the driver/loudspeaker and m denotes the microphone), towards the reference microphone. This is known as acoustic feedback and results in a corrupted reference signal u(n). Thus, the reference signal will additionally contain the acoustic feedback signal that is sensed by the reference microphone. When an acoustic control system has a feedback path the leakage often causes unstable behaviour called howling which results in an audible feedback tone.

It will therefore be appreciated that the stability of a noise control system will be significantly influenced by the feedback signal and will depend on the transfer characteristics of an acoustic feedback path $H_{dm}$ between the speaker and the reference microphone. A similar problem can arise when the speech captured by the voice microphone leaks to the speaker (driver). The problem of acoustic feedback is particularly an issue in the case of a mobile communication device, such as a mobile phone, due to the close proximity between the reference microphone and the speaker.

The frequency of the feedback tone depends on $H_{dm}$ in conjunction with $H_{nc}$. Since both $H_{dm}$ and $H_{nc}$ can change, the tone frequency can change respectively across a wide range of frequencies. The level of the feedback tone may rise quickly as the energy of the reference signal rises exponentially. Thus, the feedback tone is unpleasant and potentially damaging to the ear. There is therefore a need to try to manage and/or suppress the occurrence of howling.

A number of techniques have been proposed that seek to detect the occurrence of howling in order to enable the gain of the circuit to be automatically adjusted. However, the previously considered techniques suffer from a number of disadvantages, including high latency, the need for relatively complex frequency domain processing and problems associated with the occurrence of false positive detection of howling. For example, a previously proposed method involves a maximum peak detection method which involves performing a linear search for a sustained peak in the energy of the signal across multiple consecutive frames. As a consequence of the need to locate and track several frames of the signal, the system introduces a latency between the initial occurrence of howling and the detection of howling. Consequently, any subsequent measures taken to mitigate the feedback tone take place after a certain delay, and potentially after the sound has risen to an audible level.

The present examples are concerned with techniques for detecting howling, in particular to howling detection techniques which alleviate one or more of the problems associated with previously proposed howling detection methods.

According to an example of a first aspect there is provided a processing module for a noise control circuit, the processing module comprising:
  a howling detector configured to receive an input signal and to determine a linearity metric based on the input signal, the linearity metric comprising a measure of the linearity of a logarithmic representation of the energy of the input signal; and
  a gain adjuster configured to adjust the gain of a noise control unit.

The linearity metric—or log-linearity metric—may be derived by computing a difference between the logarithm of the energy of the signal and a trend line, the trend line being is a straight line representation of the logarithm of the energy of the signal. Coefficients of the trend line may be derived by a fitting a line to the logarithmic representation of the energy of the input signal. The process of fitting a line to the logarithmic representation of the energy of the input signal may comprise performing a least squares computation which minimises a difference between the trend line and the logarithmic representation of the energy of the input signal.

According to one or more examples the linearity metric is determined according to a goodness of fit measure of the computed trend line to the logarithm of the energy of the input signal over P samples. The goodness of fit measure r(n) may be represented by:

$$r(n) = \sqrt{\sum_{i=0}^{P-1} \left(y(n-i) - \left(\hat{\beta}_0(n) + (P-i)\cdot\hat{\beta}_1(n)\right)\right)^2}$$

where y(n) is the log energy of the input signal, $\hat{\beta}_0(n)$ is the bias of the trend line and $\hat{\beta}_1(n)$ is the slope of the trend line.

According to one or more examples the howling detection unit may be further configured to issue a command to the gain adjuster in order to reduce the gain if the linearity metric exceeds a predetermined threshold. The gain adjuster may be configured to adjust the gain by a fixed amount or by an amount which is proportional to the slope of the trend line.

According to one or more examples the howling detection unit may be further configured to estimate a maximum stable gain of the noise control unit. The maximum stable gain is proportional to the slope of the trend line.

The howling detection unit may be configured to determine, based on the determined linearity metric, if howling is likely or imminent.

According to a further aspect there is provided an audio processing system comprising a processing module according to the first aspect. The audio processing system may further comprise a noise control unit for generating a noise control signal based on a reference input signal which represents a sound detected by a reference microphone. The processing module may be connected to a speaker and wherein the speaker generates an anti-noise signal based on the noise control signal in order to cancel or at least reduce the noise detected by a reference microphone.

According to one example the howling detector may be provided in parallel with the noise control unit.

According to one example the audio processing system may further comprise a filter configured to filter out one or more frequencies or frequency bands of the input signal. The audio processing system may comprise a filterbank configured to split the input signal into a plurality of frequency bands, wherein the howling detector is operable to determine a linearity metric for each frequency band.

According to at least one example of a third aspect, there is provided a processing circuit for a noise control module comprising: a gain adjustment mechanism configured to adjust the gain of a noise control circuit if a plot of the energy of an input signal in the log domain becomes linear or tends towards linearity.

The gain of the noise control circuit may be adjusted by an amount that related to an amount which is proportional to the slope of the trend line.

The processing module may be provided in the form of a monolithic integrated circuit.

According to an example of a further aspect there is provided a device comprising a processing module according to the first aspect or a processing circuit according to the third aspect, wherein the device comprises a mobile telephone, headphone, acoustic noise cancelling headphones, a smart watch, an audio player, a video player, a mobile computing platform, a games device, a remote controller device, a toy, a machine, or a home automation controller, a domestic appliance or other portable device.

According to a fourth aspect there is provided a method of processing an audio signal comprising:
  determining a linearity metric based on an input signal, the linearity metric comprising a measure of the linearity of a logarithmic representation of the energy of the input signal; and
  adjusting the gain of the noise control unit if the linearity metric exceeds a predetermined threshold.

The step of determining a linearity metric may comprise computing a difference between the logarithm of the energy of the signal and a trend line, the trend line being is a straight line representation of the logarithm of the energy of the signal.

BRIEF DESCRIPTION OF DRAWINGS

For a better understanding of the present invention and to show how the same may be carried into effect, reference will now be made by way of example to the accompanying drawings in which.

DETAILED DESCRIPTION

The description below sets forth examples according to the present disclosure. Further example embodiments and implementations will be apparent to those having ordinary skill in the art. Further, those having ordinary skill in the art will recognize that various equivalent techniques may be applied in lieu of, or in conjunction with, the examples discussed below, and all such equivalents should be deemed as being encompassed by the present disclosure.

The methods described herein can be implemented in a wide range of devices and systems. However, for ease of explanation of one example, an illustrative example will be described, in which the implementation occurs in a mobile communication device such as a mobile phone.

Figure 3:
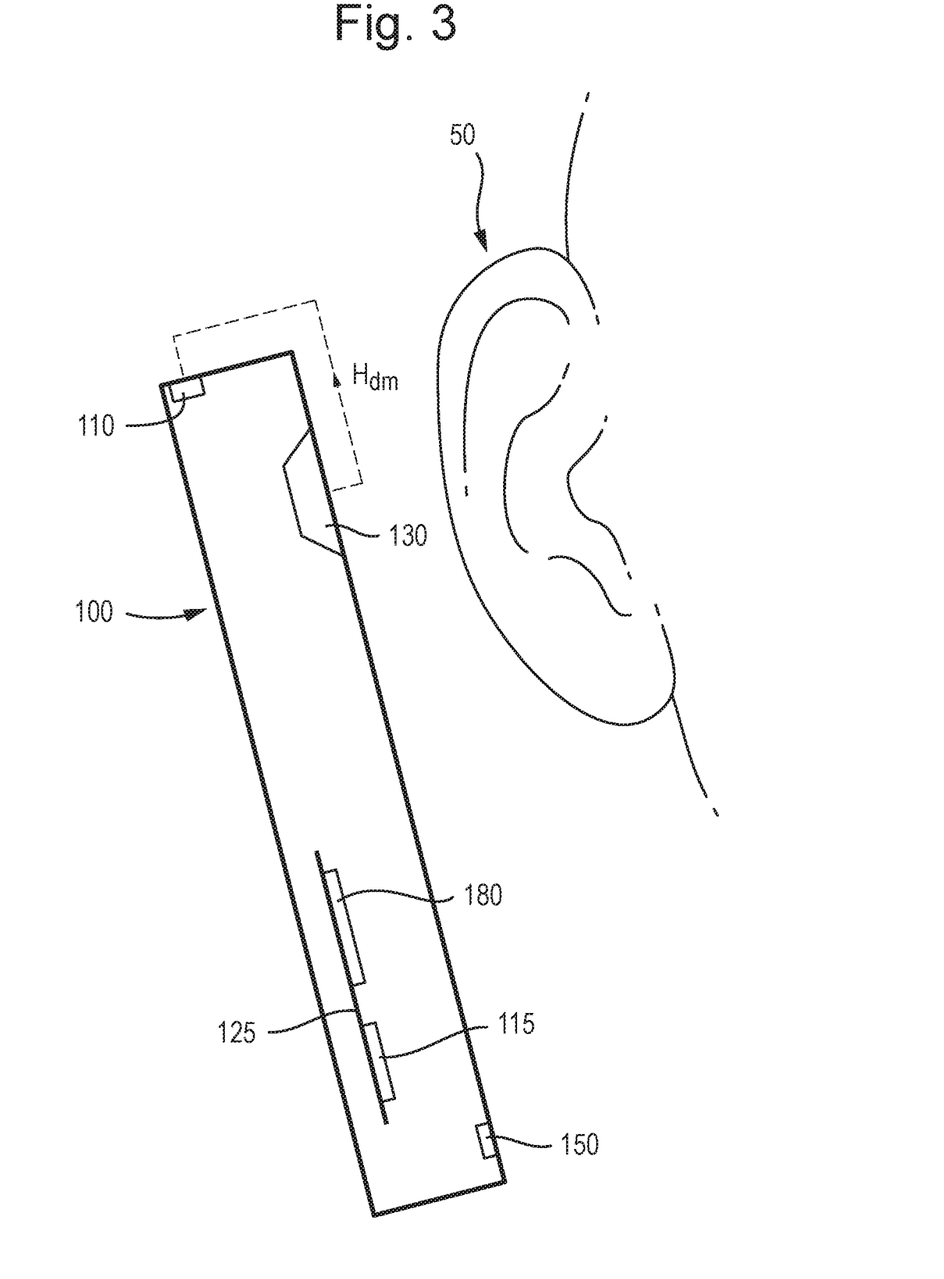
FIG. 3 illustrates a wireless communication device implementing a noise control circuit in accordance with a first example.

FIG. 3 illustrates a wireless communication device 100 implementing a noise control unit in accordance with any of the present aspects. The wireless communication device 100 is shown in proximity with a user's ear 50.

The wireless communication device comprises a transducer, such as a speaker 130, which is configured to reproduce distance sounds, such as speech, received by the wireless communication device along with other local audio events such as ringtones, stored audio program material, and other audio effects including a noise control signal. A reference microphone 110 is provided for sensing ambient acoustic events. The wireless communication device further comprises a near-speech microphone 150 which is provided in proximity to a user's mouth to sense sounds, such as speech, generated by the user.

A circuit 125 within the wireless communication device comprises an audio CODEC integrated circuit (IC) 180 that receives the signals from the reference microphone, the near-speech microphone 150 and interfaces with the speaker and other integrated circuits such as a radio frequency (RF) integrated circuit 12 having a wireless telephone transceiver.

Figure 4:
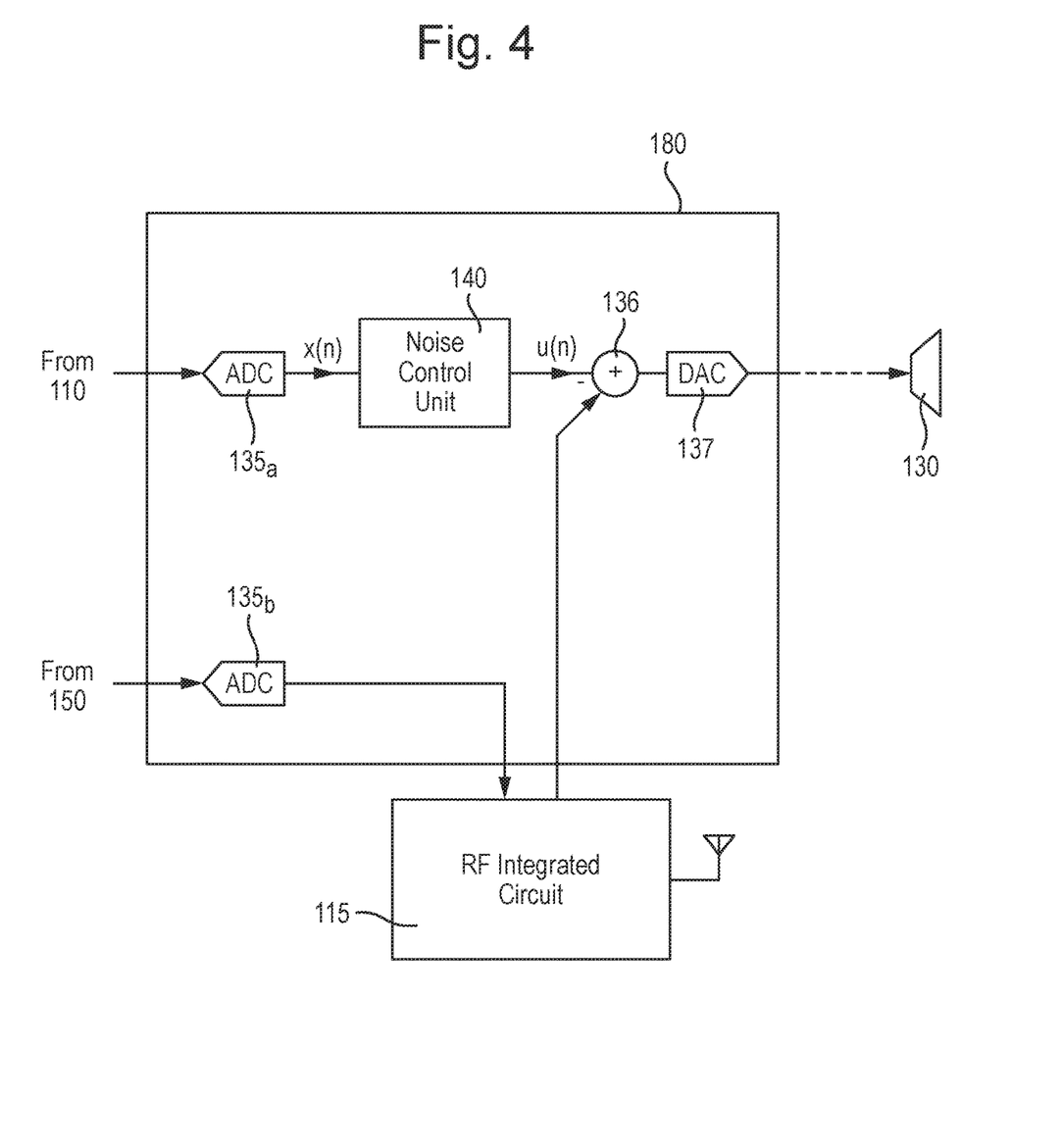
FIG. 4 is a block diagram of the audio integrated circuit provided in the wireless communication device depicted in FIG. 3.

FIG. 4 is a block diagram of the audio integrated circuit 180 provided in the wireless communication device depicted in FIG. 3 and illustrates selected units of the integrated circuit. Specifically, the integrated circuit receives an input signal from reference microphone 110 and includes an analog-to-digital converter (ADC) 135a for generating a digital representation of the input signal x(n) which is passed to a noise control unit 140 according to an example of the present aspects, wherein the noise control circuit is configured to generate a control signal u(n).

The audio integrated circuit comprises a further ADC 135b for generating a digital representation of the signal generated by the near-speech microphone 150. Combiner 136 may combine audio signals including the noise control signal u(n) (which by convention may have the same polarity as the noise in the reference microphone signal and will therefore be subtracted by the combiner 136), a portion of the near-speech microphone signal to allow a user of the wireless communication device to hear his or her own voice, in addition to downlink speech communication which is received from the radio frequency integrated circuit 115. The digital-to-analogue converter 137 receives the output of the combiner 136, amplifies the output of the DAC (Not shown) and passes the resultant signal to the speaker 130.

From consideration of FIG. 3 it will be appreciated that a feedback path $H_{dm}$ arises between the speaker 130 and the reference microphone 110.

Figure 5:
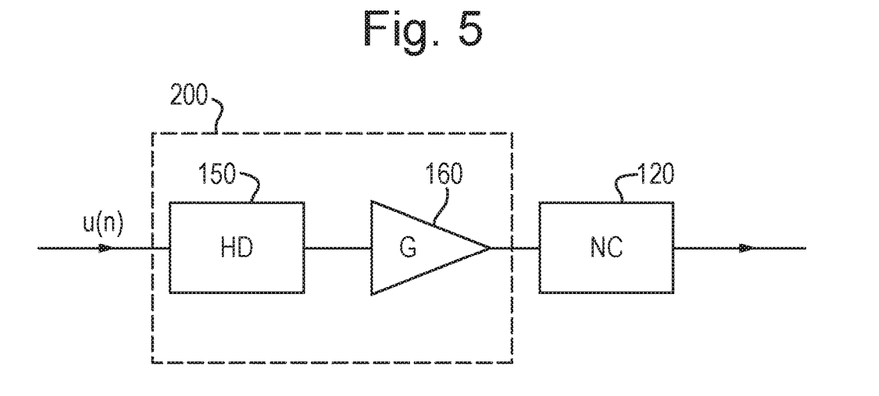
FIG. 5 illustrates a first example of a processing module.

FIG. 5 shows a processing module (howling detection system) 200 comprising a howling detector (HD) 150 and a gain adjuster 160 (e.g. amplifier) configured to control the gain of a noise control system comprising a noise control unit 120. The howling detector is configured to determine a linearity metric, or log-linearity metric, which is indicative of a measure of the linearity of the variation (over P samples) in the energy of an input signal u(n) in the logarithm domain. Thus, one or more of the present examples can be considered to rely upon a consideration of the change in the energy of the signal u(n) in the log domain.

According to one or more examples the linearity metric may be derived by computing a difference between the logarithm of the energy of the signal u(n) and a line— referred to herein as a trend line—which is a straight line representation of the logarithm of the energy of the signal u(n). It will be appreciated that the trend line may be derived by fitting a line of best fit to the log-energy data derived from the observed signal samples.

According to one or more examples the linearity metric may be determined according to a goodness of fit measure of the computed trend line to the logarithm of the energy of the input signal u(n) over P samples. The goodness of fit measure may be computed, for example, as the least square $L^2$-norm of the residuals r(n) of the trend line fitted to the observed energy data points. Thus, r(n) may be represented by:

$$r(n) = \sqrt{\sum_{i=0}^{P-1} \left(y(n-i) - \left(\hat{\beta}_0(n) + (P-i) \cdot \hat{\beta}_1(n)\right)\right)^2} \quad \text{Eq. (1)}$$

Where y(n) is the log energy of the signal u(n), $\hat{\beta}_0(n)$ is the bias of the trend line and $\hat{\beta}_1(n)$ is the slope of the trend line. Thus, equation 1 can be understood to represent the least squared difference between the logarithm of the energy of the signal y(n) and a straight line representation of the logarithm of the energy of the signal u(n). In other words, the linearity metric that is determined by the howling detector 150 according to the present examples may be considered to be r(n).

Figure 7A:
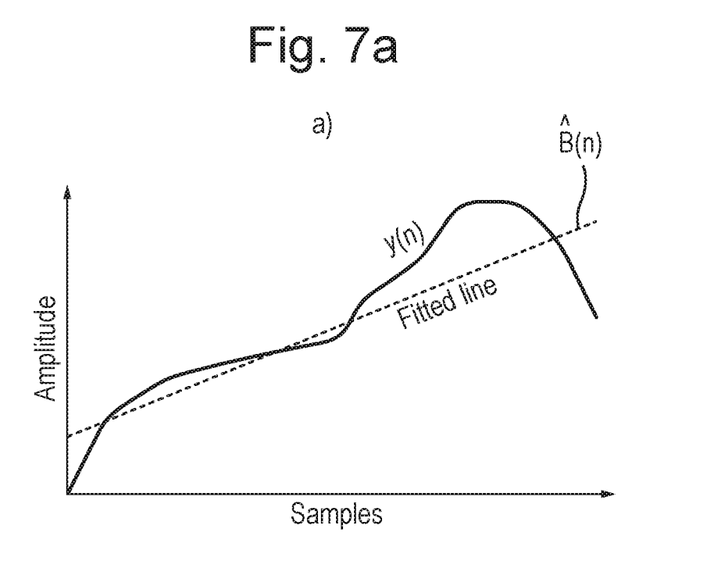
FIGS. 7a and 7b show examples of a line fitting method.
Figure 7B:
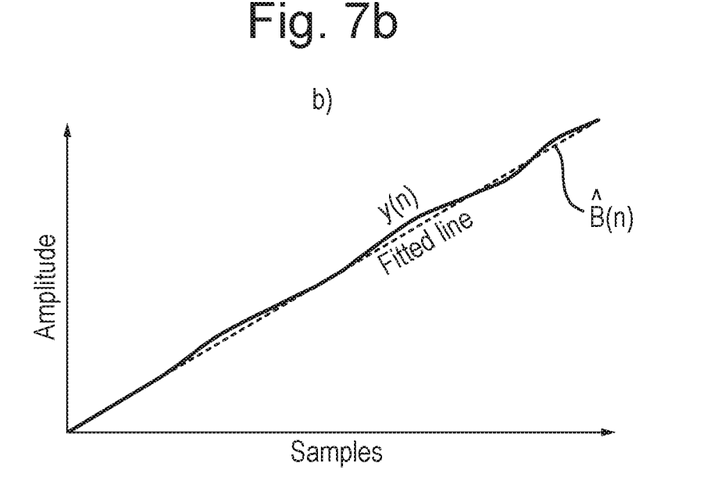

FIGS. 7a and 7b show examples of a line fitting method. In both plots the solid line represents the output log energy y(n) and the dashed line is the computed trend line, or fitted line, having line equation coefficients $\hat{\beta}^{(n)}$. In FIG. 7a a linearity metric derived on the basis of the computed trend line will be relatively low, indicating high residual values r, because the line doesn't closely represent y(n). However, in FIG. 7b a linearity metric derived on the basis of the computed trend line will be relative high, indicating low residual values r, because the signal y(n) is closely represented by the fitted line. Thus, it will be appreciated that the linearity metric or goodness of fit measure can be used as an indicator of howling by detecting when the linearity metric exceeds a threshold value (in other words when the residual values r(n) being below a given threshold).

According to one or more examples, if the linearity metric determined by the howling detector 150 exceeds a predetermined threshold this is an indication that howling is occurring.

According to one or more examples the howling detection unit 150 is configured to issue a command to the gain adjuster 160 to reduce the gain of the noise control unit. According to one or more examples the gain is reduced by a fixed amount in order to effectively reduce or turn off the noise control functionality. Thus, the howling detection circuit may be configured to cause the gain adjuster to drop the gain by a fixed amount that is pre-selected in accordance with the operating conditions of the overall system. For example, the howling detection circuit may be configured to cause the gain adjuster to drop the gain by between 25 and 40 dB, preferably by 35 dB in order to immediately kill the tone, interrupt the function of the noise control unit and alleviate any other audio distortion.

Figure 6:
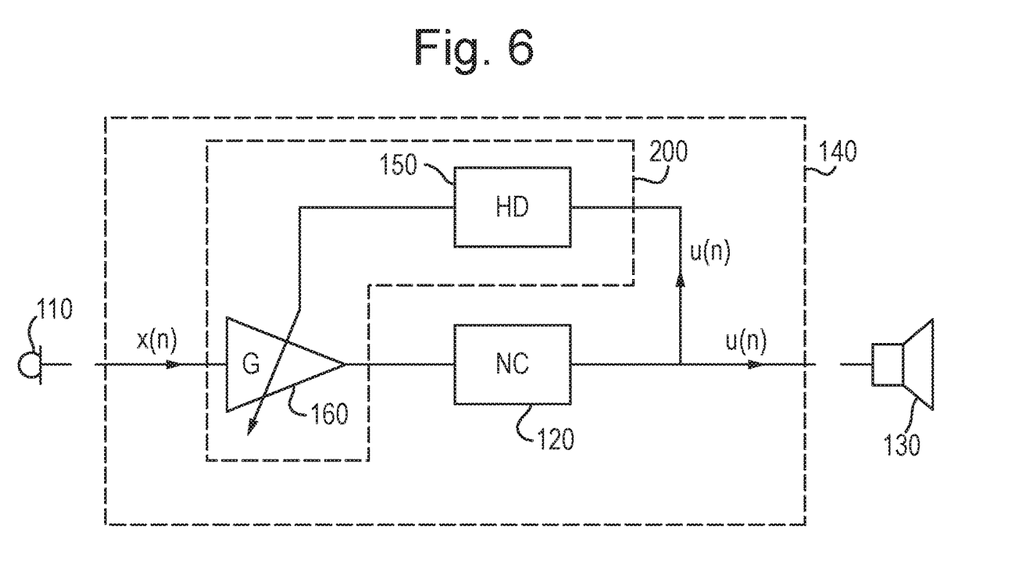
FIG. 6 illustrates a further example of a processing module according to the present aspects implemented within a noise control module 140.

FIG. 6 illustrates a possible implementation of a howling detection circuit, comprising a howling detector 150 and a gain adjuster 160 within a noise control module 140. The noise control module or noise control circuit may be implemented within a monolithic integrated circuit such as the CODEC 180 illustrated in FIG. 4, or may be implemented within any other audio processing circuit which incorporates a noise control unit for controlling or cancelling noise. It will also be appreciated that the noise control module may be provided in a variety of different devices, not just within a mobile phone.

The noise control module 140 comprises a noise control unit 120 which receives, e.g. via an analogue-to-digital converter (not shown), an input signal x(n) derived from the output signal of a reference microphone 110. The input signal represents ambient noise and other sounds including a feedback signal $h_{dm}$ detected by the reference microphone. The noise control unit 120 is operable to generate a control signal u(n) based on the input signal x(n). The control signal comprises an anti-noise signal—in other words a signal representing the noise but with inverted phase (antiphase)—that is emitted by a speaker 130 of the device in which the noise control circuit is implemented, in order to cancel or at least control or mitigate the level of the noise that is heard by a user.

In this example the control signal forms the input signal u(n) for the howling detection system 200.

Figure 8:
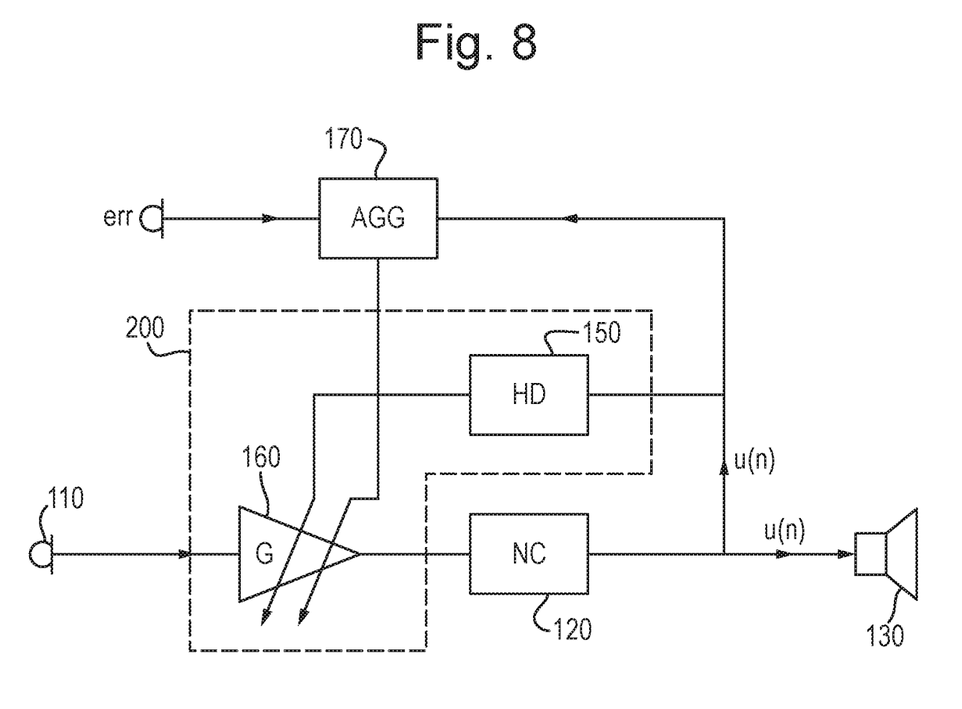
FIG. 8 illustrates a further example of a howling detection circuit implemented within an audio processing circuit.

FIG. 8 illustrates a further example in which a howling detection circuit 200 may be provided in conjunction with an automatic gain adjustment (AGA) circuit 170 which is operable, based on an input signal derived from an error microphone of the noise control system, to track the energy of the input signal over multiple frames and to make adjustments to the gain of the ANC circuit via the gain adjuster 160. Thus, the gain G may be primarily controlled by the AGA system in order to minimise the residual noise at the speaker 130. The howling detection circuit may be configured to take control of the gain adjuster 160 if howling is detected. If howling occurs, the howling detection circuit is configured to cause the gain adjuster to drop the gain by around 25 to 40 dB, in order to interrupt the operation of the noise control unit 120 and bring a stop to the audio distortion.

One or more examples described herein may advantageously allow howling detection based on a single frame (e.g. 5 msec). Thus, the present examples potentially benefit from a faster detection of howling than previously proposed techniques which require computations to take place over multiple frames. Furthermore, examples of the present aspects are advantageously performed purely in the time domain, circumventing the need to transform the signal to frequency domain, thereby lowering the complexity of the system and easing the memory capacity requirements in comparison to techniques which require frequency domain processing.

Figure 9:
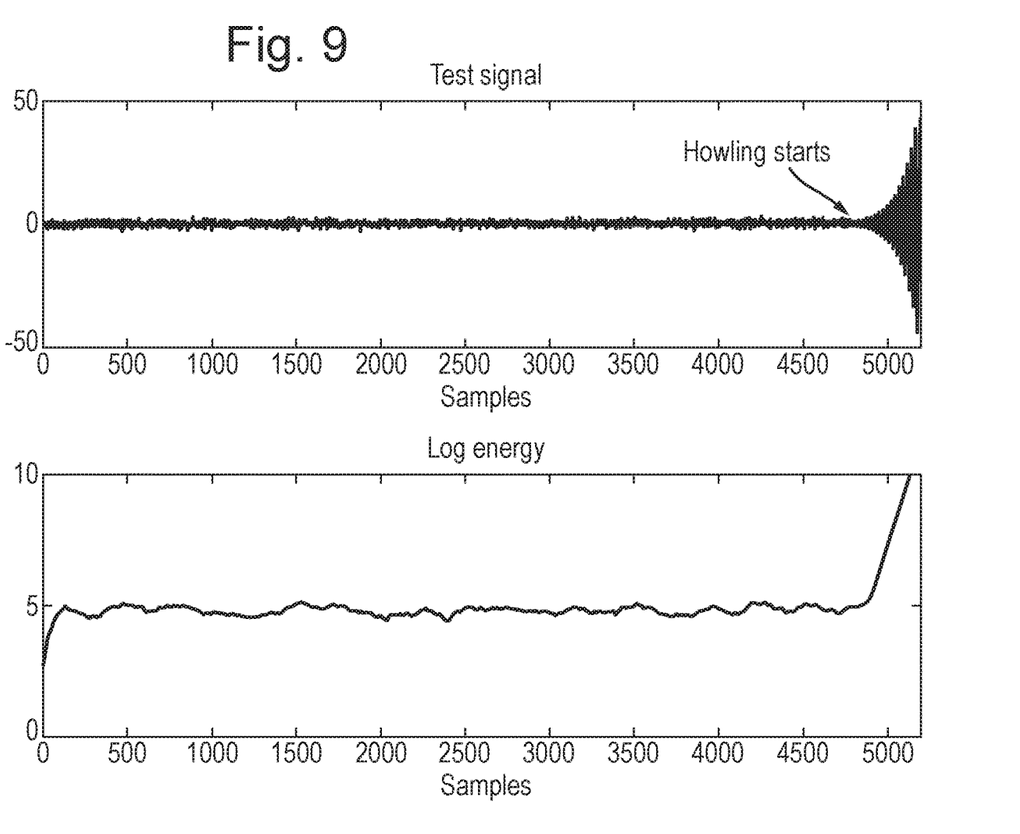
FIG. 9 shows first and second plots to illustrate the increasing slope in the energy or of an input signal.

A theoretical background to the present examples will now be discussed with reference to FIG. 9.

When the howling occurs, an exponentially rising sinusoid appears in the signal of interest u(n). The increasing slope in the energy or amplitude of u(n), which is illustrated graphically by the first plot shown in FIG. 9, is clearly exponentially dependent on the gain. Thus, it will be appreciated that if the logarithm of the energy of the signal is computed, the dependence will become linear, as illustrated in the second plot shown in FIG. 9. In other words, when howling is present the log energy increases linearly.

Examples described herein are based on monitoring for an exponential increase in the amplitude of the signal, which may be readily recognised from a linear increase in the log-domain (dB), in order to try to detect or predict the occurrence of howling.

The output log energy y(n) may be computed using a smoothing of the instant energy of the input signal u(n). Thus:

$$y(n) = \log(a(n)), \text{ where } a(n) = \lambda_y \cdot a(n-1) + (1-\lambda_y) \cdot u^2(n) \quad \text{Eq. (2)}$$

The energy a(n) is therefore proportional to the square of the sample.

If we define a straight line where $\hat{\beta}_0(n)$ is the bias of the line and $\hat{\beta}_0(n)$ is the slope of the line, the line equation term in equation 1 can be written in the vector format as:

$$\hat{\beta}_0 + (P-i) \cdot \hat{\beta}_1 = [\hat{\beta}_0(n), \hat{\beta}_1(n)]^T \cdot [1, P-i] = \hat{\beta}(n) \cdot [1, P-i] \quad \text{Eq. (3)}$$

Where T indicates matrix transpose operation.

The line equation coefficients $\hat{\beta}(n)$ can be computed by minimising a cost function between observed samples and fitted line equation. This can be done for example by solving a least squares problem which tries to find the line $\hat{\beta}(n)$ that minimises the Euclidean distance to the observed data y(n).

$$\hat{\beta}(n) = \underset{\beta}{\arg\min}(r(n)^2) = (X^T X)^{-1} X^T y(n) \quad \text{Eq. (4)}$$

Where:

$$X = \begin{bmatrix} 1 & 1 \\ 1 & 2 \\ \vdots & \vdots \\ 1 & P \end{bmatrix}, \quad y(n) = \begin{bmatrix} y(n-P+1) \\ y(n-P+2) \\ \vdots \\ y(n) \end{bmatrix}$$

In order to make this approach robust to different energy levels of the incoming signal u(n), the signal y(n) may be normalised such that it is between 0 and 1.

$$y'(n) = \frac{y(n) - \min(y(n))}{\max(y(n)) - \min(y(n))} \quad \text{Eq. (5)}$$

Figure 10:
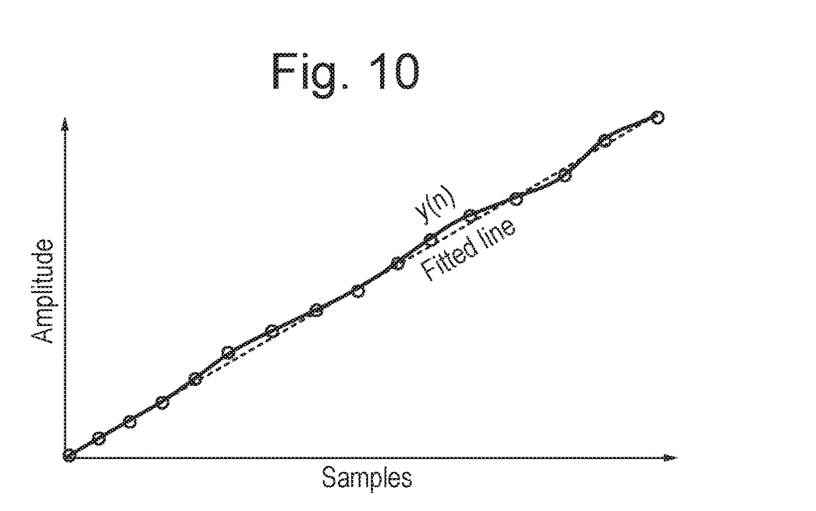
FIG. 10 shows a plurality of data samples plotted on a graphical representation of the amplitude of an input signal, as well as a fitted line.

Due to this normalisation, the slope $\hat{\beta}_1(n)$ must converge to $$\frac{1}{P-1}$$

in the presence of howling and the line coefficients may be computed using:

$$\hat{\beta}(n) = \quad \text{Eq (6)}$$

$$\left( \begin{bmatrix} 1 & 1 & \cdots & 1 \\ 1 & 2 & \cdots & P \end{bmatrix} \cdot \begin{bmatrix} 1 & 1 \\ 1 & 2 \\ \vdots & \vdots \\ 1 & P \end{bmatrix} \right)^{-1} \cdot \begin{bmatrix} 1 & 1 & \cdots & 1 \\ 1 & 2 & \cdots & P \end{bmatrix} \cdot \begin{bmatrix} y'(n-P+1) \\ y'(n-P+2) \\ \vdots \\ y'(n) \end{bmatrix} =$$

$$\tilde{X} \cdot \begin{bmatrix} y'(n-P+1) \\ y'(n-P+2) \\ \vdots \\ y'(n) \end{bmatrix}$$

Where $\tilde{x}$ may be precomputed to avoid matrix inversion and to reduce the number of cycles. In addition, in order to reduce MIPS, y'(n) can be subsampled to only use a subset of the P samples to solve the least squares problem presented in Eq. 3. In the example illustrated in FIG. 10 the new subset only includes 16 samples represented by each of the circles and obtained from y(n), the samples being equidistant apart starting from first sample and ending with the last sample.

Smoothing may be applied to the estimated slope coefficient $\bar{\beta}_1(n)$ and to the residual r(n)

$$\bar{r} = \lambda_r \cdot r(n-1) + (1-\lambda_r) \cdot r(n) \quad \text{Eq. (7)}$$

$$\bar{\beta}_1(n) = \lambda_\beta \cdot \bar{\beta}_1(n-1) + (1-\lambda_\beta) \cdot \hat{\beta}_1(n) \quad \text{Eq. (8)}$$

In addition, according to one or more examples the parameter a is used as a confidence interval on the estimated slope coefficient such that howling is only determined to be detected if the slope is between these confidence intervals.

$$\left(\frac{1}{P-1}\right)\cdot(1-\alpha) \leq \overline{\beta}_1 \leq \left(\frac{1}{P-1}\right)\cdot(1+\alpha) \quad \text{Eq. (9)}$$

According to one or more examples, the predetermined threshold of the linearity metric is set such that a positive indication of howling is determined before log-linearity is actually reached. The positive indication may therefore beneficially provide an advance indication that howling is likely to occur or is imminent. Such examples may be implemented in conjunction with a process which additionally monitors the change in the linearity metric over time. It will be appreciated that it is possible to detect when the linearity metric increases—i.e. when the logarithm of the energy of the signal u(n) tends towards, or approaches, a certain degree of linearity. Thus, according to one or more examples, once the linearity metric meets a predetermined threshold, a further detection process is carried out to ascertain if the linearity metric is tending towards or is approaching a value which indicates a high degree of linearity—i.e. that the linearity is increasing. Specifically, a reduction in the value of the residuals r(n) over time will indicate that the system is tending towards howling.

Thus, a further advantage of monitoring the linearity of the log-energy is that it is possible to observe when the system is tending towards howling (as indicated e.g. by a goodness of fit measure). In other words, according to one or more examples, it is possible to observe when the system is starting to become unstable, rather than relying upon the detection of a characteristic of howling after it has started. Thus, according to one or more examples, it is possible to determine when howling is likely, or imminent. This will be prior to the actual occurrence of any audible howling.

The linearity metric determined by the howling detector 150 can therefore be considered to be a representation or estimation of the stability of the noise control system. If the system is tending towards howling, which is an unstable condition, adjustment may be beneficially made to the gain G of the circuit in order to restore the noise control system to a more stable state. According to one or more examples, the gain is reduced by an amount which is related to a measure of the degree of instability. Thus, according to one or more examples the gain may be reduced by an amount which depends on how unstable the system is. Thus, the howling detector may be configured to estimate a required amount of gain reduction that is proportional to the degree of instability. This may, for example, be derived from the slope of the un-normalised log-energy. This slope, when howling is present, is proportional to the gain that the system needs to reduce to keep the system stable (no howling).

Thus, the amount by which the gain needs to be adjusted can be considered to be a maximum stable gain (MSG) of the system. The maximum stable gain (MSG) can be considered to be a measure that shows if the system is stable (MSG negative) or if it is unstable (MSG positive). This is actually the minimum extra gain that the system needs to decrease to become stable.

The information from the slope can be also used to adjust the location of poles and zeros of the feed-forward noise cancelling filter.

An advantage of determining an amount of gain adjustment required based on the slope of the fitted trend line that it becomes possible to keep the maximum gain in the ANC without making the system howl. Thus, some degree of noise control can still take place even though the system is in or tending towards an unstable state. In contrast, if the gain is reduced by a fixed amount (35 dB), this noise control functionality is effectively prevented.

Figure 11:
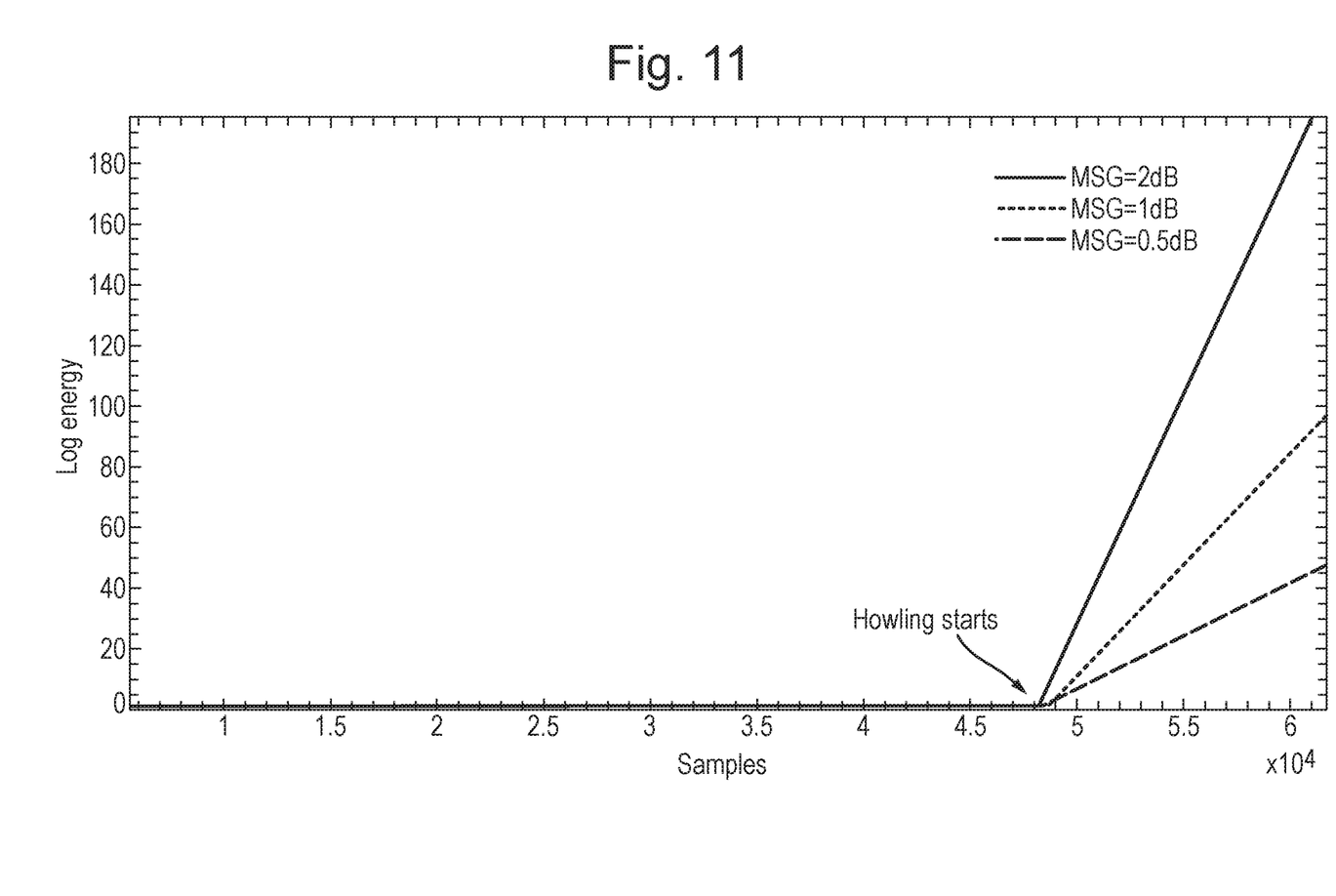
FIG. 11 shows the log energy of the signal output for 3 different cases.

FIG. 11 shows the log energy of the signal output for three different cases (values of MSG) where the system becomes unstable after the sample 48000. From this it is apparent that the slope of the fitted line is directly related to the desired MSG value. Thus, according to one or more examples, it is possible to determine the minimum gain reduction necessary.

Figure 12:
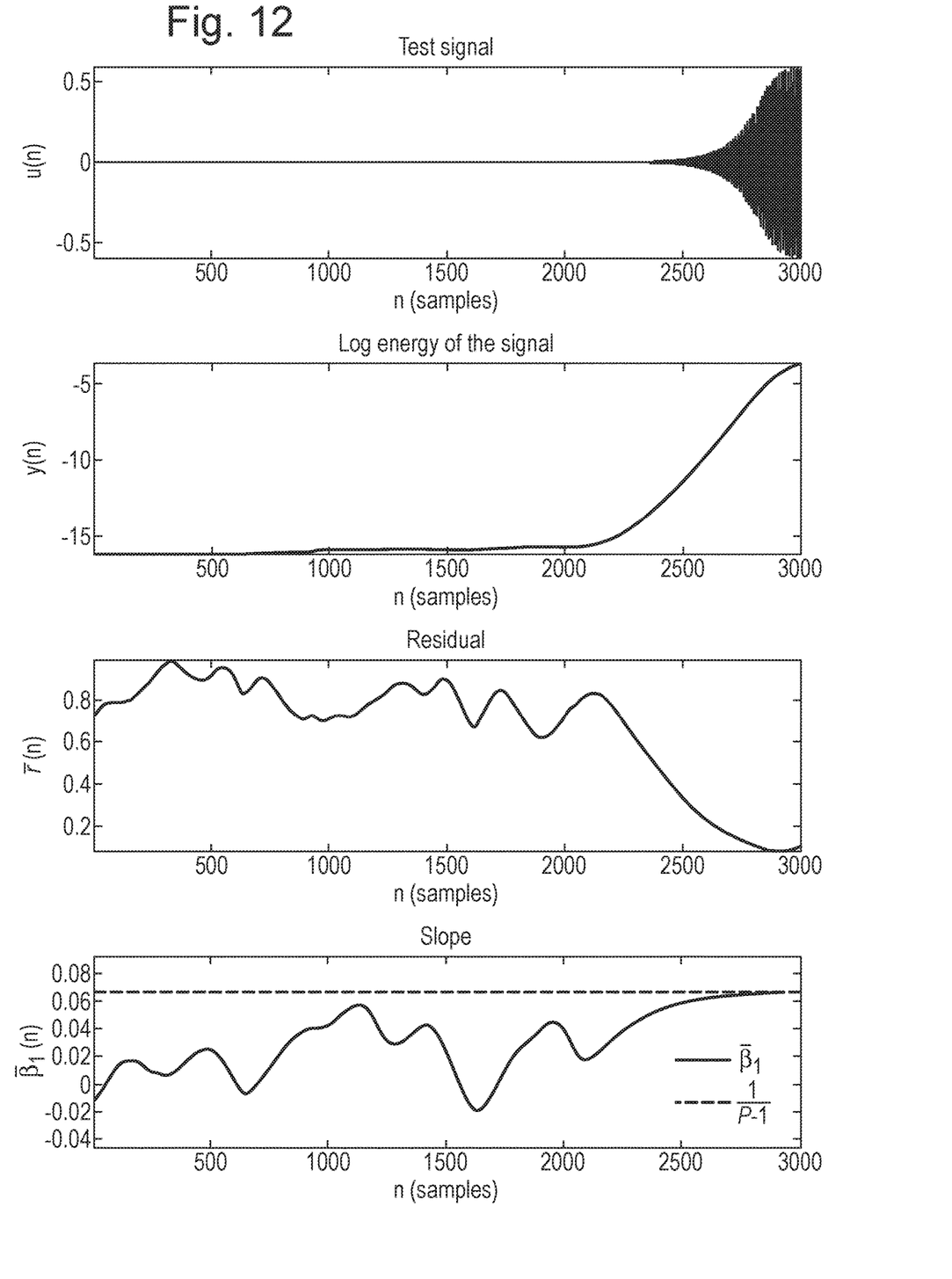
FIG. 12 shows several plots to illustrate the signals used by the proposed method to detect howling.

FIG. 12 shows several plots relating to a test signal and signals used by the proposed method to detect howling. The first plot shows the test signal in the time domain over 3000 samples (approximately 62 ms). The second plot displays the computed log energy from the signal shown first plot. The third and fourth plots show the two metrics used to decide if howling is present. In this example, the system becomes unstable around sample 2300. At this point, the log energy y(n) starts to clearly grow at a linear rate which makes the residual smaller since y(n) is closer to a line. Furthermore, the slope of this log energy y(n) (last figure) is also converging to the expected value plotted as a red line in the figure.

Figure 13:
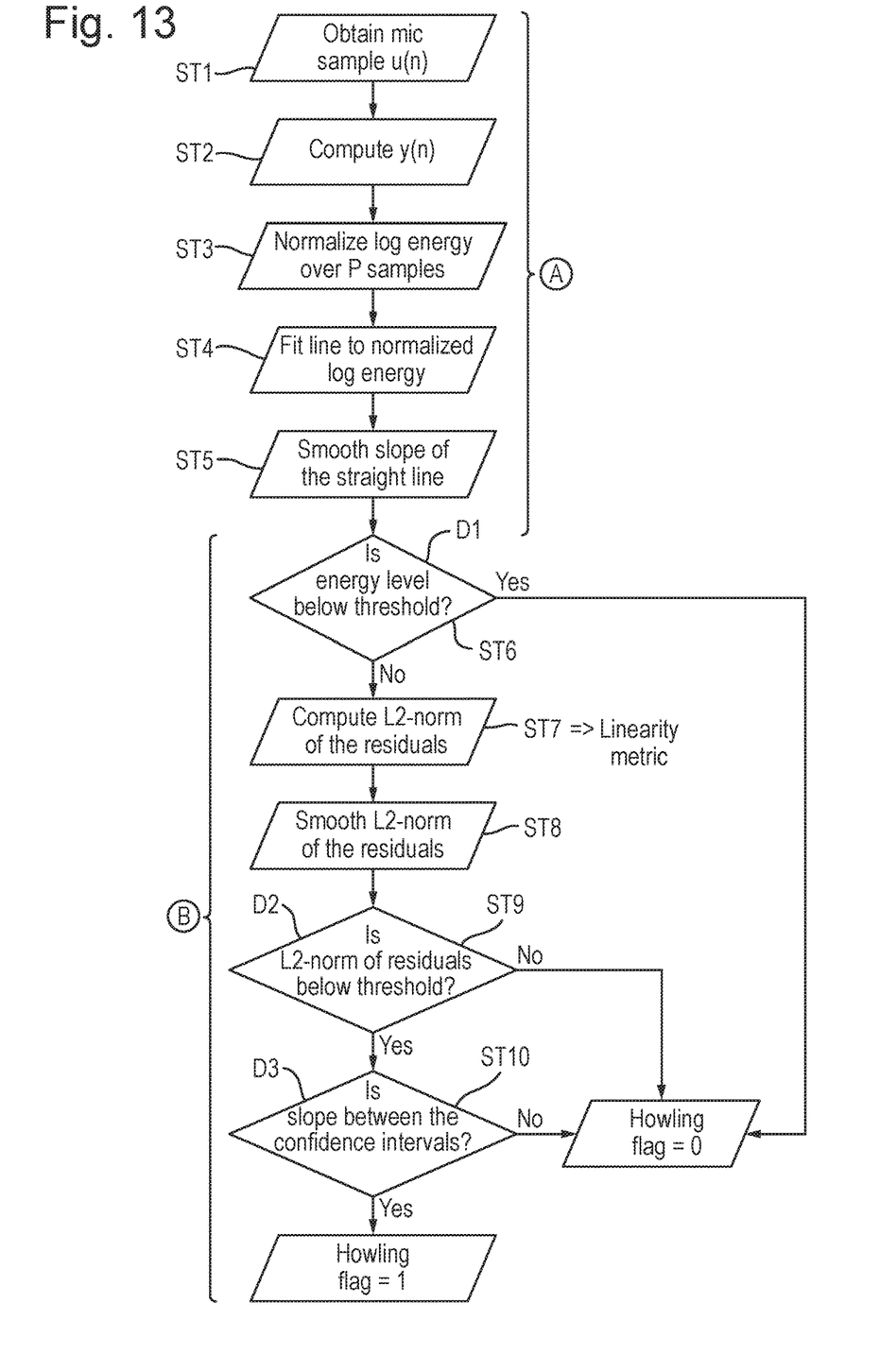
FIG. 13 illustrates a howling detection process according to one example.

FIG. 13 shows a process flow diagram to illustrate a process of howling detection according to one example. The process illustrated in FIG. 13 may, for example, take place in a howling detector 150 as illustrated in FIGS. 5, 6 and 8.

In a first step ST1 a signal comprising audio data derived from a microphone is obtained and forms an input signal u(n). In a second step ST2 the log energy y(n) of the signal u(n) is computed from the amplitude a(n) using, e.g. equation (2). The signal y(n) is normalised at ST3 such that it is between 0 and 1, as given by equation 5. A line of best fit is derived at ST4 in order to fit a straight line to the normalised plot of the log energy. The resulting line or trend line is smoothed at ST5 using e.g. equation (9). Steps ST1 to ST5 inclusive can be considered to form part of a processing stage A which comprises the generation of a trend line.

In a decision-making stage B, a first decision D1 is made at ST6 in order to ascertain if the energy level y(n) is below a given threshold. If the energy level is below the threshold, a no-howling decision (or howling flag=0) is reached. If the energy level is determined to be at or above the energy threshold, a number of further decision making steps are carried out in order to determine a log-linearity metric. Specifically, at ST7 a goodness of fit measure of the computed trend line to the logarithm of the energy of the input signal over P samples is determined. The goodness of fit measure may be determined, for example, in accordance with equation (1) and the resulting linearity metric may be smoothed according to equation (8).

A second decision D2 is made at ST9. Specifically, the linearity metric is compared with a predetermined threshold wherein, if the linearity metric is below the predetermined threshold, indicating that a goodness of fit between the observed samples and the trend line returns high residual values, a no-howling decision is reached. However, if the linearity metric is at or above the predetermined threshold, a third decision-making process D3 is performed at ST10 in order to ascertain if the slope of the estimated trend line falls between the confidence intervals according to equation (11). If the slope does not fall between the confidence intervals, a no-howling decision is reached. However, if the slope does fall between the confidence intervals, a result of howling (or howling flag=1) is reached.

It will be appreciated that the indication of howling will be reached when the linearity metric exceeds a predetermined threshold and that the threshold may be set to detect circumstances of imminent howling (tending towards howling) as well as circumstances of actual howling. If the predetermined threshold is set to detect circumstances of imminent howling (in other words the linearity metric exceeds a lower threshold and/or may be tending towards a higher linearity metric threshold, thus indicating that the system becoming more unstable), the gain adjuster may be operable to adjust the gain by an amount proportional to the level of instability of the system, e.g. by a few decibels, rather than by a larger (typically fixed) amount that will interrupt/kill the noise control unit.

Thus, in a subsequent step a command may be issued to a gain adjustment unit in order to adjust the gain of an associated noise control circuit.

The possible actions taken in response to the process illustrated in FIG. 13 may be as follows:

No howling: no action taken.

Howling: Drop gain by fixed amount in order to interrupt ANC.

Imminent howling: reduce ANC gain slightly (e.g. 3-5 dB or by an amount derived from the slope of the fitted line (without any normalisation).

It will be appreciated that a howling detection process according to one or more examples may be restricted to at least one defined frequency band—e.g. between f1 and f2. This may be achieved by filtering the input signal in order to eliminate certain frequencies or concentrate on certain frequency band(s). An advantage of this arraignment is that "howling-type" acoustic patterns can be filtered out. That is, audio sounds such as whistling or sirens which may otherwise give rise to a false positive indication of howling. Thus, an advantage of one or more of the present examples is that the occurrence of false positives is alleviated, resulting in a more robust system.

Figure 14:
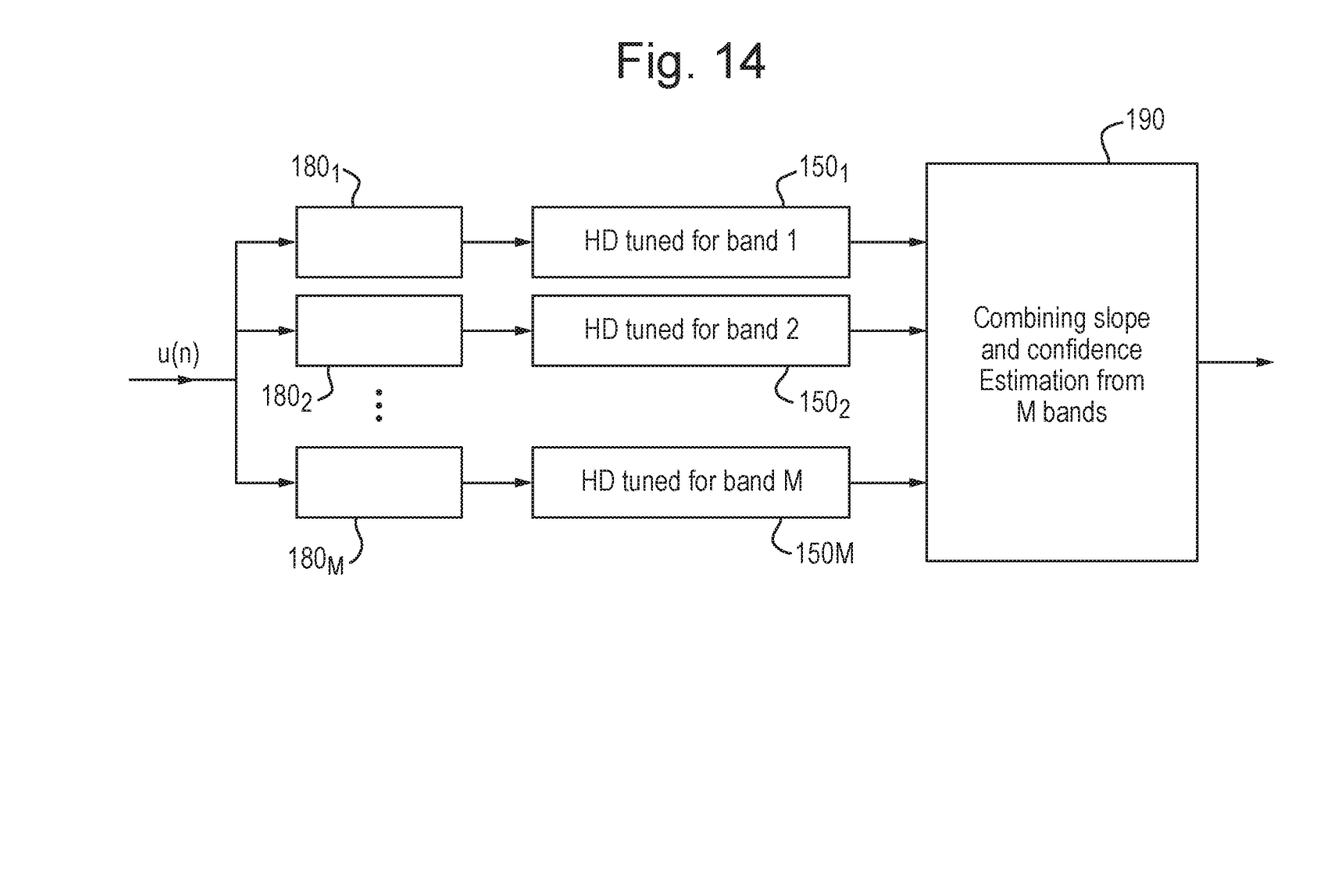
FIG. 14 illustrates a system incorporating multiband howling detection.

According to one or more examples, and as illustrated in FIG. 14, howling detection may be carried out on the basis of a plurality of frequency bands. This may be referred to as multiband howling detection, wherein a plurality of filters $180_1 \ldots _M$ allow the input signal u(n) to be tuned for a plurality M of frequency bands. Thus, the system may be considered to comprise a filterbank which carries out frequency band splitting of the input signal.

The howling detector $150_1 \ldots _M$ is operable to determine a log-linearity metric for each frequency band. The slope and confidence measures may be readily combined in a combiner 190 by checking each band independently and then acting upon the channel with high confidence and slope closest to 1/(P−1). According to this arrangement, a decision of howling may be reached if howling is detected in any single frequency band.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications examples of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the examples may also be implemented using code running on a field-(re)programmable analogue array or similar device in order to configure analogue hardware.

Note that as used herein the term unit or module shall be used to refer to a functional unit or block which may be implemented at least partly by dedicated hardware components such as custom defined circuitry and/or at least partly be implemented by one or more software processors or appropriate code running on a suitable general purpose processor or the like. A unit may itself comprise other units, modules or functional units. A unit may be provided by multiple components or sub-units which need not be co-located and could be provided on different integrated circuits and/or running on different processors.

Examples may be implemented in a host device, especially a portable and/or battery powered host device such as a mobile computing device for example a laptop or tablet computer, a games console, a remote control device, a home automation controller or a domestic appliance including a smart home device a domestic temperature or lighting control system, a toy, a machine such as a robot, an audio player, a video player, or a mobile telephone for example a smartphone.

It should be noted that the above-mentioned examples illustrate rather than limit the invention, and that those skilled in the art will be able to design many alternative examples without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A howling detector configured to receive an input audio signal, to determine a logarithmic representation of the energy of the input audio signal, and to determine a measure of linearity of the logarithmic representation of the energy.

2. The howling detector as claimed in claim 1, wherein the linearity metric is derived by computing a difference between the logarithm of the energy of the signal and a trend line, the trend line being a straight line representation of the logarithm of the energy of the signal.

3. The howling detector as claimed in claim 2, wherein coefficients of the trend line are derived by fitting a line to the logarithmic representation of the energy of the input signal.

4. The howling detector as claimed in claim 3, wherein fitting a line to the logarithmic representation of the energy of the input audio signal comprises performing a least squares computation which minimises a difference between the trend line and the logarithmic representation of the energy of the input audio signal.

5. The howling detector as claimed in claim 2, wherein the linearity metric is determined according to a goodness of fit measure of the computed trend line to the logarithm of the energy of the input audio signal over P samples.

6. The howling detector as claimed in claim 5, wherein the goodness of fit measure r(n) is represented by:

$$r(n) = \sqrt{\sum_{i=0}^{P-1}\left(y(n-i) - (\hat{\beta}_0(n) + (P-i)\cdot\hat{\beta}_1(n))\right)^2}$$

where y(n) is the log energy of the input signal, $\hat{\beta}_0(n)$ is the bias of the trend line and $\hat{\beta}_1(n)$ is the slope of the trend line.

7. The howling detector as claimed in claim 1, wherein the howling detection unit is further configured to issue a command to the gain adjuster in order to reduce the gain if the linearity metric exceeds a predetermined threshold.

8. The howling detector as claimed in claim 7, wherein the gain adjuster is configured to adjust the gain by a fixed amount.

9. The howling detector as claimed in claim 1, wherein the howling detection unit is further configured to estimate a maximum stable gain of the noise control unit.

10. The howling detector as claimed in claim 2, wherein the howling detection unit is further configured to estimate a maximum stable gain of the noise control unit, and wherein the maximum stable gain is proportional to the slope of the trend line.

11. The howling detector as claimed in claim 1, wherein the howling detection unit is configured to determine, based on the determined linearity metric, if howling is likely or imminent.

12. An audio processing system comprising the howling detector as claimed in claim 1 and further comprising a noise control unit for generating a noise control signal based on a reference input audio signal which represents a sound detected by a reference microphone.

13. The audio processing system as claimed in claim 12, wherein the howling detector is connected to a speaker and wherein the speaker generates an anti-noise signal based on the noise control signal in order to cancel or at least reduce the noise detected by a reference microphone.

14. The audio processing system as claimed in claim 13, wherein the howling detector is provided in parallel with the noise control unit.

15. The howling detector as claimed in claim 1, further comprising a filter configured to filter out one or more frequencies or frequency bands of the input audio signal.

16. The howling detector as claimed in claim 1, further comprising a filterbank configured to split the input audio signal into a plurality of frequency bands, wherein the howling detector is operable to determine a linearity metric for each frequency band.

17. A processing circuit for a noise control module comprising:
a gain adjustment mechanism configured to adjust the gain of a noise control circuit if a logarithmic representation of the energy of an input audio signal becomes linear or tends towards linearity.

18. The processing circuit as claimed in claim 17, wherein the gain of the noise control circuit is adjusted by an amount that related to a difference between a measure of the linearity of the plot of the energy of the input audio signal in the log domain and a target linearity metric.

19. The howling detector as claimed in claim 1, in the form of a monolithic integrated circuit.

20. A device comprising the howling detector according to claim 1, wherein the device comprises a mobile telephone, headphone, acoustic noise cancelling headphones, a smart watch, an audio player, a video player, a mobile computing platform, a games device, a remote controller device, a toy, a machine, or a home automation controller, a domestic appliance or other portable device.

21. A processing module for a noise control circuit, the processing module comprising the howling detector as claimed in claim 1, and a gain adjuster configured to adjust the gain of a noise control unit.

22. A processing module for a noise control circuit, the processing module comprising the howling detector as claimed in claim 1.

* * * * *

UNITED STATES PATENT AND TRADEMARK OFFICE
CERTIFICATE OF CORRECTION

| | | |
|---|---|---|
| PATENT NO. | : 10,681,458 B2 | Page 1 of 1 |
| APPLICATION NO. | : 16/004900 | |
| DATED | : June 9, 2020 | |
| INVENTOR(S) | : Peso Parada et al. | |

It is certified that error appears in the above-identified patent and that said Letters Patent is hereby corrected as shown below:

In the Specification

1. In Column 7, Line 61, delete "$\tilde{\beta}_0(n)$," and insert -- $\hat{\beta}_1(n)$ --, therefor.

2. In Column 8, Line 61, delete "$\tilde{\beta}_1(n)$," insert -- $\hat{\beta}_1(n)$ --, therefor.

3. In Column 8, in Equation (7), delete "$\bar{r}=\lambda_r \cdot r(n-1)+(1-\lambda_r)\cdot r(n)$" and insert -- $\bar{r}(n) = \lambda_r \cdot \bar{r}(n-1) + (1-\lambda_r) \cdot r(n)$ --, therefor.

4. In Column 8, Line 67, delete "parameter a" and insert -- parameter α --, therefor.

In the Claims

5. In Column 13, Line 38, in Claim 13, delete "a reference microphone." and insert -- the reference microphone. --, therefor.

6. In Column 14, Line 10, in Claim 16, delete "a linearity metric" and insert -- the linearity metric --, therefor.

7. In Column 14, Line 19, in Claim 18, delete "that related" and insert -- that is related --, therefor.

Signed and Sealed this
Twenty-seventh Day of September, 2022

Katherine Kelly Vidal
*Director of the United States Patent and Trademark Office*